(12) United States Patent
Müller et al.

(10) Patent No.: US 7,334,492 B2
(45) Date of Patent: Feb. 26, 2008

(54) SHIFTING UNIT FOR AN AUTOMATIC TRANSMISSION

(75) Inventors: Bernd Müller, Friedrichshafen (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 128 days.

(21) Appl. No.: 11/284,474

(22) Filed: Nov. 22, 2005

(65) Prior Publication Data
US 2006/0107778 A1 May 25, 2006

(30) Foreign Application Priority Data
Nov. 23, 2004 (DE) .................. 10 2004 056 407

(51) Int. Cl.
*F16H 59/00* (2006.01)
(52) U.S. Cl. ...................................... 74/335
(58) Field of Classification Search ............ 74/335
See application file for complete search history.

(56) References Cited

U.S. PATENT DOCUMENTS 5,697,251 A * 12/1997 Lorriette et al. ............. 74/335
5,850,898 A    12/1998 Böhme et al.
6,102,829 A *  8/2000 Muddell et al. ............. 477/77
6,116,391 A *  9/2000 Kremmling et al. ........ 192/3.58
6,637,282 B2* 10/2003 Harries ........................ 74/335
6,705,175 B1*  3/2004 Klatt ............................ 74/335

FOREIGN PATENT DOCUMENTS

| DE | 196 33 420 A1 | 3/1997 |
|---|---|---|
| DE | 100 29 497 A1 | 1/2002 |
| DE | 102 43 282 A1 | 4/2004 |
| DE | 102 49 341 | 5/2004 |
| WO | WO-2005/078318 A1 | 5/2005 |

* cited by examiner

*Primary Examiner*—Dirk Wright
(74) *Attorney, Agent, or Firm*—Davis Bujold & Daniels, P.L.L.C.

(57) ABSTRACT

A shifting unit (1) for an automatic transmission, especially controlled by pressurized medium for an automobile, with multiple valves which are connected to each other through a pressure supply line (30) and a pressure reduction line (32). The chambers (16, 18) of servo cylinders (10, 12) fitted with servo actuators contain at least one shift valve each (22, 24, 26, 28). There is a pressure accumulator (36) designed in between the pressure supply line (30) and the shift valves (22, 24, 26, 28).

13 Claims, 1 Drawing Sheet

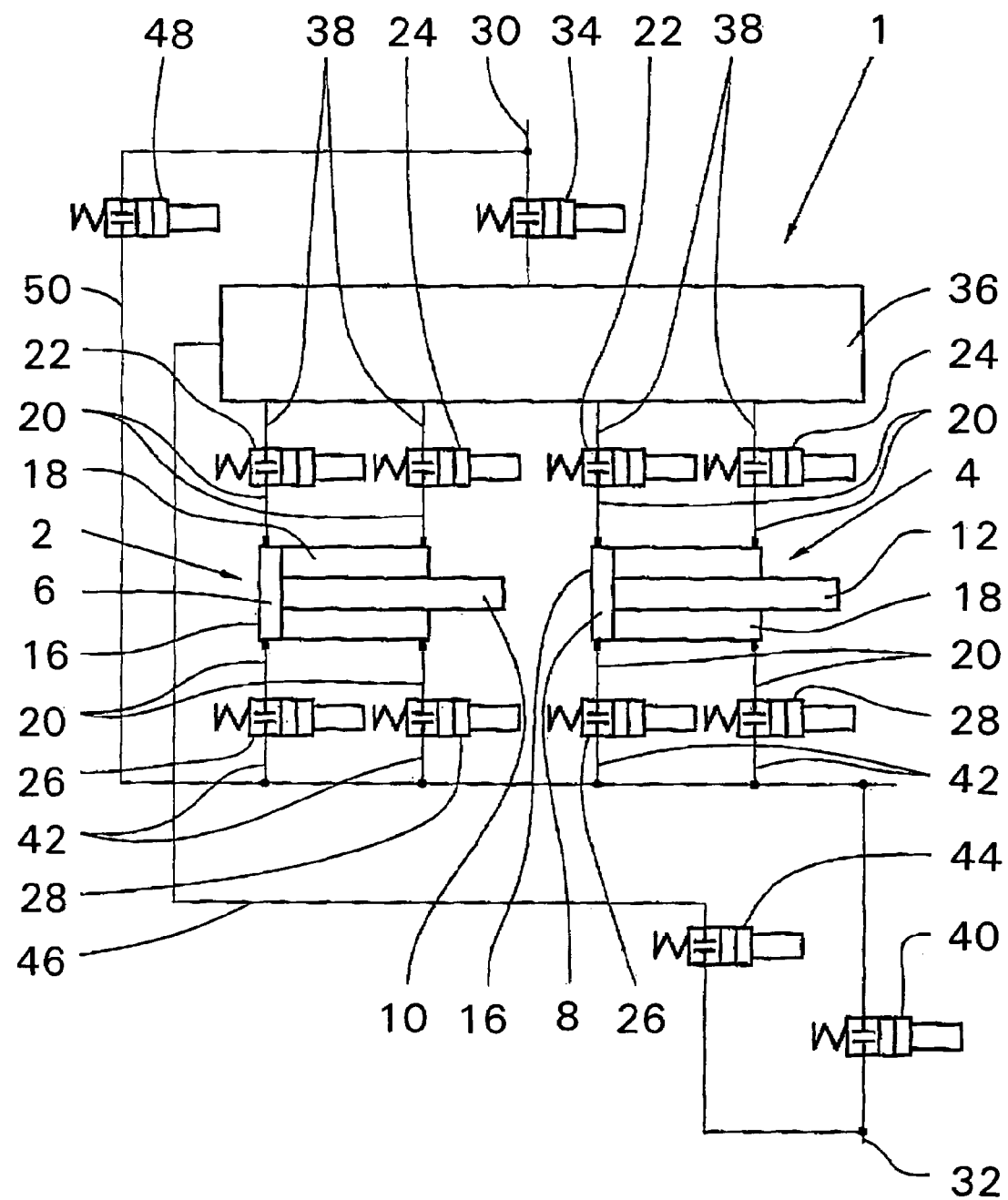

SHIFTING UNIT FOR AN AUTOMATIC TRANSMISSION

This application claims priority from German Application Serial No. 10 2004 056 407.8 filed Nov. 23, 2004.

FIELD OF THE INVENTION

The invention refers to a shifting unit for an automatic transmission especially with control through a pressurized medium for an automobile.

BACKGROUND OF THE INVENTION

A hydraulic control for an automatic automobile transmission is known from DE 102 49 341 A1 which guarantees a drive free from breakdowns and is also cost effective to manufacture. It is suggested that instead of the known and expensive mechanical pressure reduction valves, a synchronized electromagnetic shifting valve could be used. This shifting valve matches the pressure level of the main pressure line to the control pressure level of the pressurized medium like a piston-cylinder arrangement.

A shifting unit for an automatic automobile transmission is known from the unpublished DE 102004006683 A1 which has multiple valves which are connected to each other through a pressure supply line and a pressure reduction line. Thereby the chambers of the servo cylinders which are provided with servo actuators have at least one shifting valve each. The servo cylinders which are built as piston-cylinder units have additional valves arranged so that they close separately, open and block the pressure supply and pressure reduction lines whereby the function of the pressure supply lines and the pressure reduction lines could be interchanged with the help of this shifting unit.

The objective of the invention is to develop a hydraulic or a pneumatic control for an automatic automobile transmission which has improved shifting dynamics and is also fail safe and cost effective to manufacture.

The above problem has been solved through the shifting unit for an automatic transmission with a pressurized medium control for a vehicle, with multiple valves which are connected to each other through a pressure supply line and a pressure reduction line, whereby the chambers of the servo cylinders provided with servo actuators have at least one shifting valve each and there is pressure accumulator capacity between the pressure supply line and the shifting valve.

This construction has the advantage that through the inclusion of a pressure accumulator capacity, a high dynamic of the entire system is guaranteed at all times. By designing the pressure accumulator capacity sufficiently large in comparison with the volume of the chambers in the servo cylinders, even in the case a shift is carried out, sufficiently large pneumatic or hydraulic pressure is generated very quickly. Therefore shorter shifting times can be achieved.

Advantageously in several parts of the shifting unit, preferably at the main cut off valve, a smaller and cost effective shifting element could be used.

It is of further advantage that the risk of failure is decreased further since in the case of sufficient size of the pressure accumulator capacity, it could be used for emergency switching off in the case of loss of pressure in the vehicle by keeping the main cut off valve closed.

The pressure accumulator capacity in the invention also offers other advantages. The pressure accumulator capacity could contain excess pressure irrespective of whether or not shifting is carried out at that moment or not. As a result, the dynamics of the shifting device are further increased and also prevention of an over load caused by reduction in pressure in the shifting is ensured.

The pressure reservoir can be held right even after the shift off of the vehicle fitted with a shifting unit which is good for the starting process with reference to control and regulation mechanisms while starting the vehicle again.

By having a large enough pressure accumulator capacity, it can initiate emergency switching off in the case of loss of pressure in the vehicle due to closure of the main shifting valve.

SUMMARY OF THE INVENTION

It is preferable to have a main shifting valve upstream in the pressure supply line from the pressure accumulator so that pressure spikes resulting from switching off the main shifting valve are taken off and diverted to the pressure reservoir present in the pressure accumulator.

In a further design of such a shifting unit, the pressure accumulator can be connected to the pressure reduction line through a line which can be switched off using a switch off valve. As a result of this, with a synchronized control of the shifting valve, the pressure level in the pressure accumulator volume can be properly regulated.

Further, the chambers of the servo actuators can be provided with two shifting valves each whereby one is connected to the pressure accumulator and the other is pressure reduction line.

This strictly functional separation increases the shifting dynamics of the shifting unit since every shift valve can be connected to the chamber through an individual line especially for this purpose.

When the upstream pressure supply line of the main shifting valve is connected to the pressure reduction line through a shifting valve, the function of the pressure reduction line and the pressure supply line can be exchanged by the use of a 2/2 valve at the place of the shift valves arranged in the chambers and in the shift valves arranged in the pressure supply and pressure reduction lines. Then it would be possible to fill the pressure accumulator quickly through both the 2/2 valves arranged in the pressure supply line by short switching at least one of the chambers. In addition, the pressure build up in the cylinder chambers can be accelerated in which both the shift valves of this one cylinder chamber can be actively controlled.

The downstream line connected to the pressure reduction line and the pressure accumulator could discharge to a further shift valve in the pressure reduction line.

The mentioned valves are preferably electromagnetically controlled 2/2 valves which are cost effective and appropriate for known commercial valves.

The mentioned lines and the pressure accumulator are preferably housed together in the same housing.

BRIEF DESCRIPTION OF THE DRAWINGS

The invention will now be described, by way of example, with reference to the accompanying drawings in which:

FIG. 1 is a schematic drawing of the design.

DETAILED DESCRIPTION OF THE INVENTION

The shifting unit 1 has servo cylinders 2 and 4 which can be housed together in a common housing which is not shown. In the servo cylinders 2 and 4, the pistons 6 and 8 have been arranged and can move axially and are provided with servo actuators 10 and 12 which are designed as control rods. The servo actuators divide the servo cylinders 2 and 4 into opposite chambers 16 and 18. Shifting valves 22, 24, 26 and 28 are connected to the chambers 16 and 18 through a specially designed line 20.

The shifting unit 1 is provided with a pressure supply line 30 which has either a pneumatic or a hydraulic medium. The medium can discharge through the pressure reduction line 32. The pressure reduction line 32 shows a shifting valve 40 and is connected to the shifting valves 26 and 28 through a special line 42.

A main cut off valve 34 is arranged inside the pressure supply line 30 where the pressure accumulator capacity 36 is arranged directly upstream. The pressure accumulator capacity 36 is closed with the help of shift valves 22 and 24 with a special line 38.

The pressure accumulator capacity 36 is connected to a pressure reduction line 32 through a line 46 controlled by the shifting valve 44 of the shift valve 40.

Upstream of the main cut off valve 34, the line 50 controlled by another valve 48 branches off and is connected to the pressure reduction line 32.

During the usage of the shifting unit, the servo actuator 10 is moved towards the right as per the given figure whereby the shift valve 22 opens and the hydraulic or pneumatic medium flows from the pressure accumulator 36 into the chamber 16 through the line 38 and the line 20. The shift valves 24 and 26 are closed when the shift valve 28 is opened for emptying the chamber 18.

In a similar manner, the servo actuator 10 can move left from its position whereby the shifting valves 24 and 26 can be opened.

The shifting unit 1 is retained completely with respect to its functionality when there is a single valve failure. Should the valves 22 to 28 get blocked or get stuck in their positions as a result of an electric defect, this failure of functionality can be compensated as long as there are shifting valves 48, 44 or 40 arranged in the pressure reduction line 32 and in the pressure supply line 30. By controlling them the function of supply and discharge can be interchanged whereby the function of each of the valves is reversed. Since each of the chambers 16 or 18 are provided with different valves 22, 26 and 24, 28 and provided with separate lines 38 and 42, the failed function of the other shift valve can be completely replaced.

A time separated control of the opening or closing function of the shift valve in the pressure supply and pressure reduction lines 30 and 32 can change the dampening of the entire system as also vary the dynamics of the shifting device 1.

REFERENCE NUMERALS

1 shifting unit
2 servo cylinder
4 servo cylinder
6 piston
8 piston
10 servo actuator
12 servo actuator
16 chamber
18 chamber
20 line
22 shift valve
24 shift valve
26 shift valve
28 shift valve
30 pressure supply line
32 pressure reduction line
34 main cut off valve
36 pressure accumulator
38 line
40 shift valve
42 line
44 shift valve
46 line
48 shift valve
50 line

The invention claimed is:

1. A shifting unit (1) for an automatic transmission, the shifting unit comprising:
    a pressurized medium driven control for a vehicle, and the control having multiple valves which are connected to each other and between a pressure supply line (30) and a pressure reduction line (32);
    chambers (16, 18) are arranged with servo cylinders (2, 4) fitted with servo actuators (10, 12) with each of the chambers (16, 18) having at least one shift valve (22, 28), and a pressure accumulator (36) being located between the pressure supply line (30) and the valves (22, 24, 26, 28).

2. A shifting unit (1) for an automatic transmission, the shifting unit comprising:
    a pressurized medium driven control for a vehicle, and the control having multiple valves which are connected to each other through a pressure supply line (30) and a pressure reduction line (32); and
    chambers (16, 18) are arranged with servo cylinders (2, 4) fitted with servo actuators (10, 12) with each of the chambers (16, 18) having at least one shift valve (22, 28), and a pressure accumulator (36) being located between the pressure supply line (30) and the valves (22, 24, 26, 28);
    wherein the pressure supply line (30) has a main cut off valve (34) upstream before the pressure accumulator (36).

3. A shifting unit (1) for an automatic transmission, the shifting unit comprising:
    a pressurized medium driven control for a vehicle, and the control having multiple valves which are connected to each other through a pressure supply line (30) and a pressure reduction line (32); and
    chambers (16, 18) are arranged with servo cylinders (2, 4) fitted with servo actuators (10, 12) with each of the chambers (16, 18) having at least one shift valve (22, 28), and a pressure accumulator (36) being located between the pressure supply line (30) and the valves (22, 24, 26, 28);
    wherein the pressure accumulator (36) is connected to the pressure reduction line (32) through a line (46) which can be blocked by a shift valve (44).

4. A shifting unit (1) for an automatic transmission, the shifting unit comprising:
    a pressurized medium driven control for a vehicle, and the control having multiple valves which are connected to each other through a pressure supply line (30) and a pressure reduction line (32); and
    chambers (16, 18) are arranged with servo cylinders (2, 4) fitted with servo actuators (10, 12) with each of the chambers (16, 18) having at least one shift valve (22, 28), and a pressure accumulator (36) being located between the pressure supply line (30) and the valves (22, 24, 26, 28);

wherein the chambers (16, 18) of the servo actuators (10, 12) have two shift valves (22, 26 or 24, 28) each, a first shift valve can be connected to the pressure accumulator (36) and a second shift valve can be connected to the pressure reduction valve (32).

5. A shifting unit (1) for an automatic transmission, the shifting unit comprising:

a pressurized medium driven control for a vehicle, and the control having multiple valves which are connected to each other through a pressure supply line (30) and a pressure reduction line (32); and chambers (16, 18) are arranged with servo cylinders (2, 4) fitted with servo actuators (10, 12) with each of the chambers (16, 18) having at least one shift valve (22, 28), and a pressure accumulator (36) being located between the pressure supply line (30) and the valves (22, 24, 26, 28);

wherein the pressure supply line (30) is connected to the pressure reduction line (32) upstream of the main cut off valve (34) through a shift valve (48).

6. The shifting unit (1) according to claim 1, wherein the pressure accumulator (36) discharges into the pressure reduction line (32) through a line (46) connected to the pressure reduction line (32) down stream of the shift valve (40).

7. The shifting unit (1) according to claim 2, wherein the pressure supply line (30) is connected to the pressure reduction line (32) upstream of the main cut off valve (34) through a shift valve (48).

8. The shifting unit (1) according to claim 3, wherein the pressure supply line (30) is connected to the pressure reduction line (32) upstream of the main cut off valve (34) through a shift valve (48).

9. The shifting unit (1) according to claim 4, wherein the pressure supply line (30) is connected to the pressure reduction line (32) upstream of the main cut off valve (34) through a shift valve (48).

10. The shifting unit (1) according to claim 2, wherein the pressure accumulator (36) discharges into the pressure reduction line (32) through a line (46) connected to the pressure reduction line (32) down stream of the shift valve (40).

11. The shifting unit (1) according to claim 3, wherein the pressure accumulator (36) discharges into the pressure reduction line (32) through a line (46) connected to the pressure reduction line (32) down stream of the shift valve (40).

12. The shifting unit (1) according to claim 4, wherein the pressure accumulator (36) discharges into the pressure reduction line (32) through a line (46) connected to the pressure reduction line (32) down stream of the shift valve (40).

13. The shifting unit (1) according to claim 5, wherein the pressure accumulator (36) discharges into the pressure reduction line (32) through a line (46) connected to the pressure reduction line (32) down stream of the shift valve (40).

* * * * *